Oct. 21, 1941.  A. THOMAS ET AL  2,260,097
RECORD CARD CONTROLLED STATISTICAL MACHINE
Filed Oct. 7, 1939  15 Sheets-Sheet 1

INVENTORS.
A. THOMAS AND
N. G. HOLDEN.
BY Sydney E. Page.
ATTORNEY

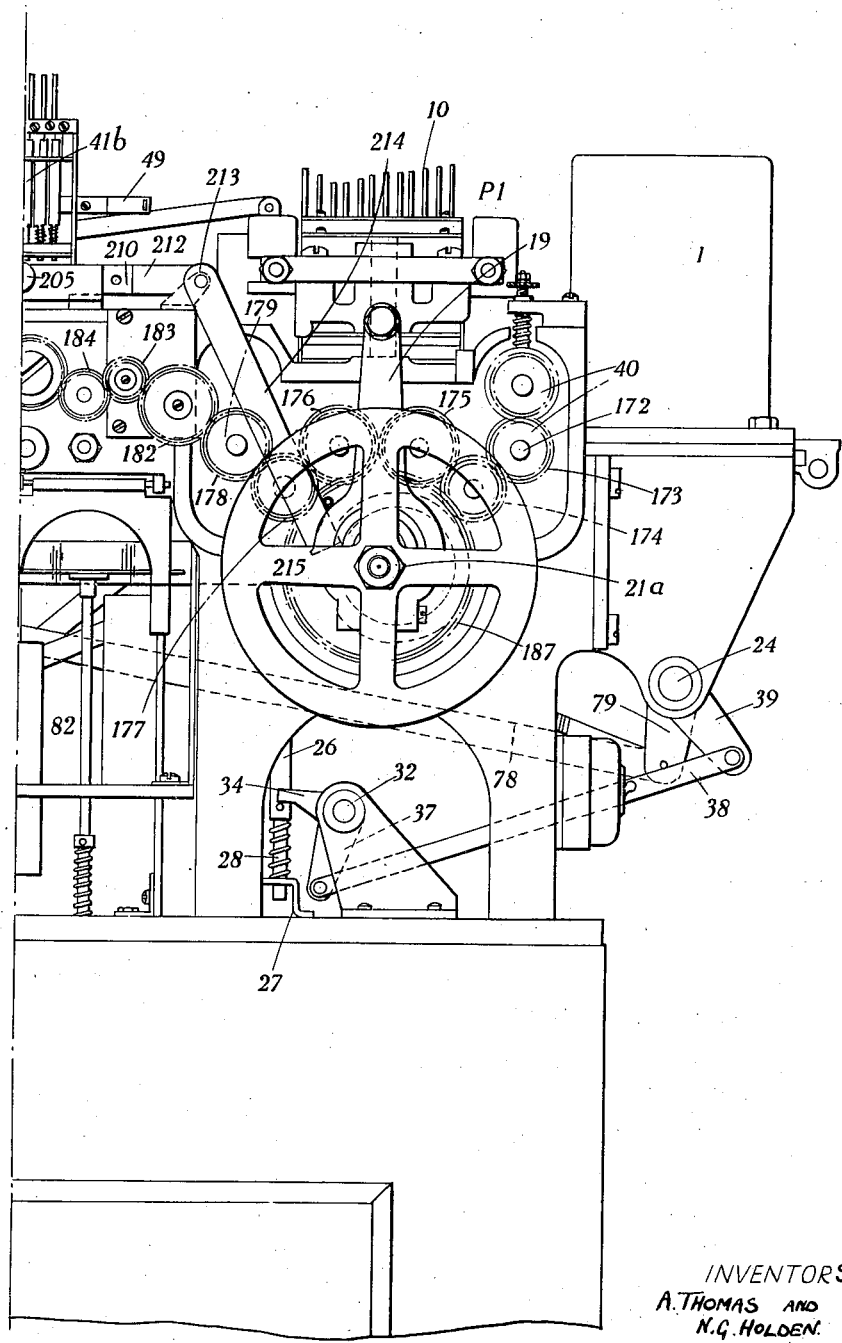

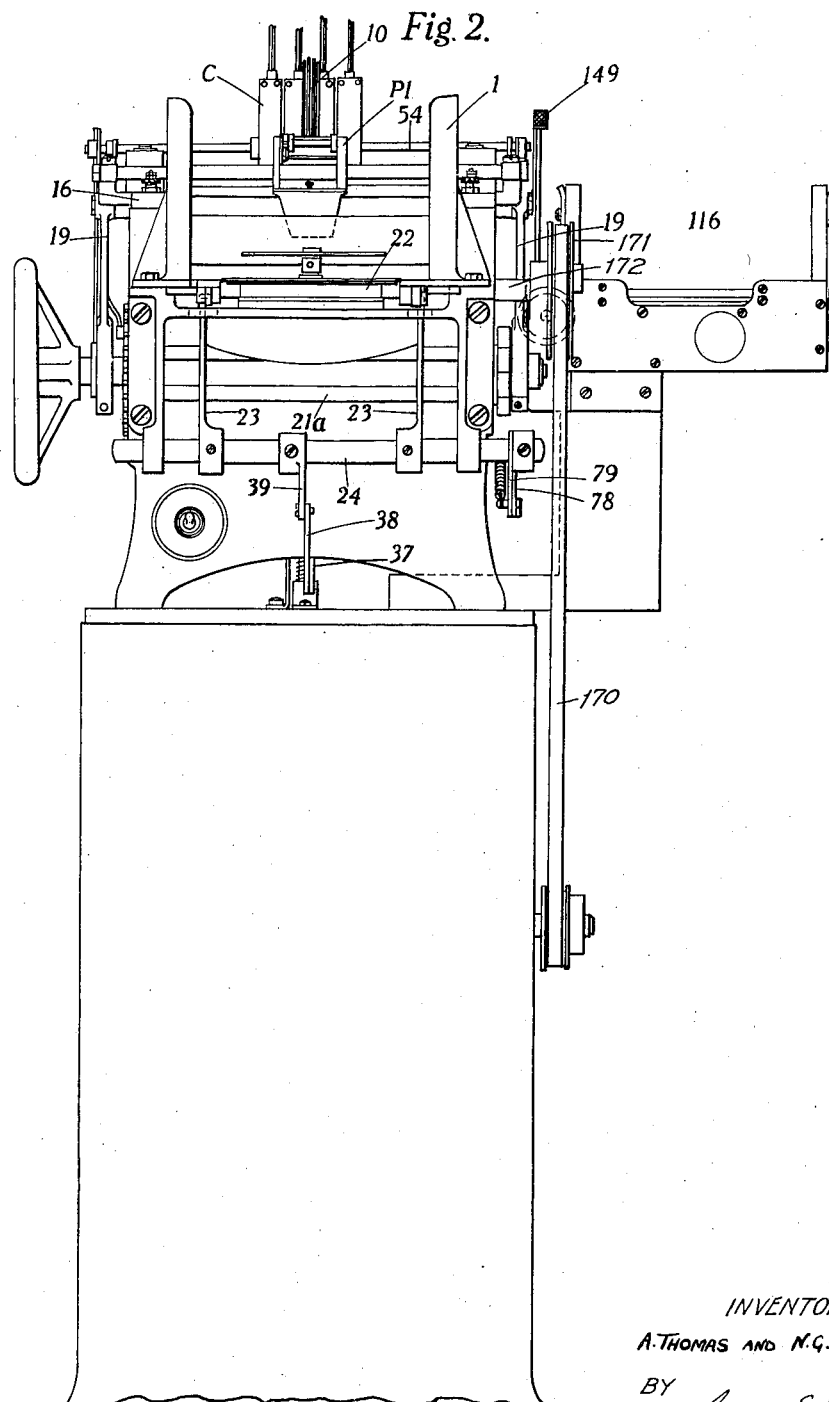

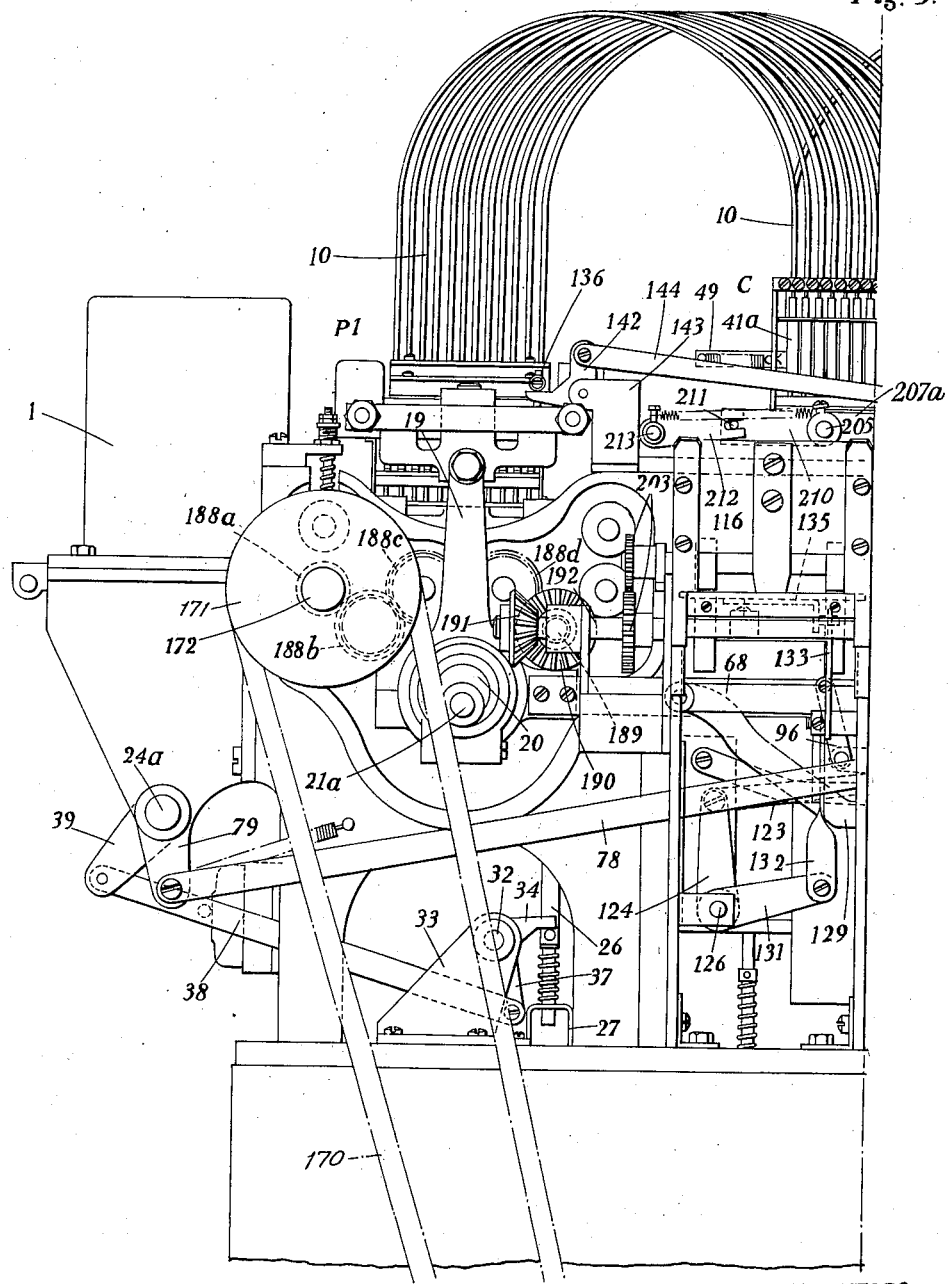

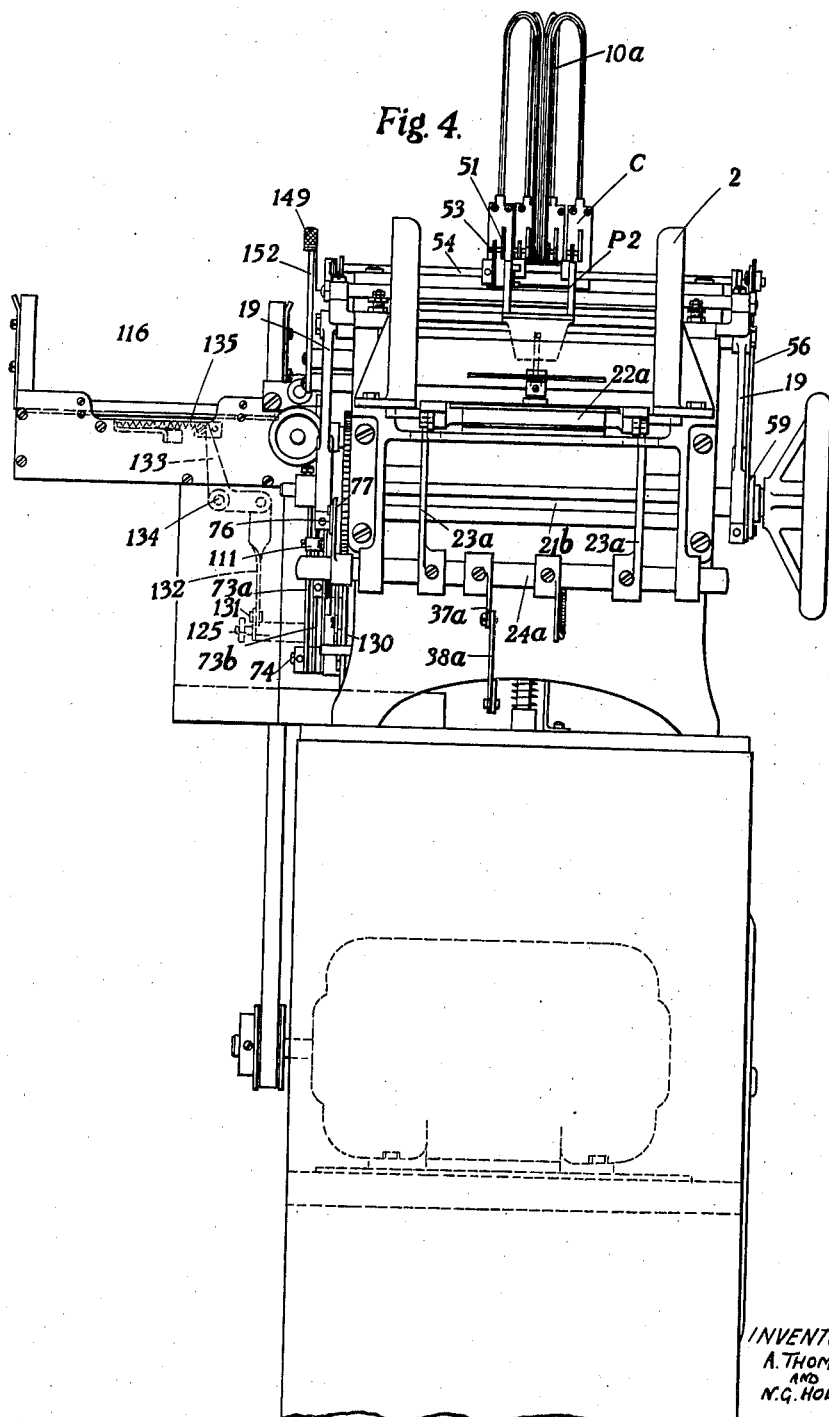

Oct. 21, 1941.  A. THOMAS ET AL  2,260,097

RECORD CARD CONTROLLED STATISTICAL MACHINE

Filed Oct. 7, 1939  15 Sheets-Sheet 7

INVENTORS
A. THOMAS AND N. G. HOLDEN.
BY Sydney E. Page.

ATTORNEY

Oct. 21, 1941.　　A. THOMAS ET AL　　2,260,097
RECORD CARD CONTROLLED STATISTICAL MACHINE
Filed Oct. 7, 1939　　15 Sheets-Sheet 8

INVENTORS.
A. THOMAS AND N. G. HOLDEN.
BY Sydney E. Page.
ATTORNEY

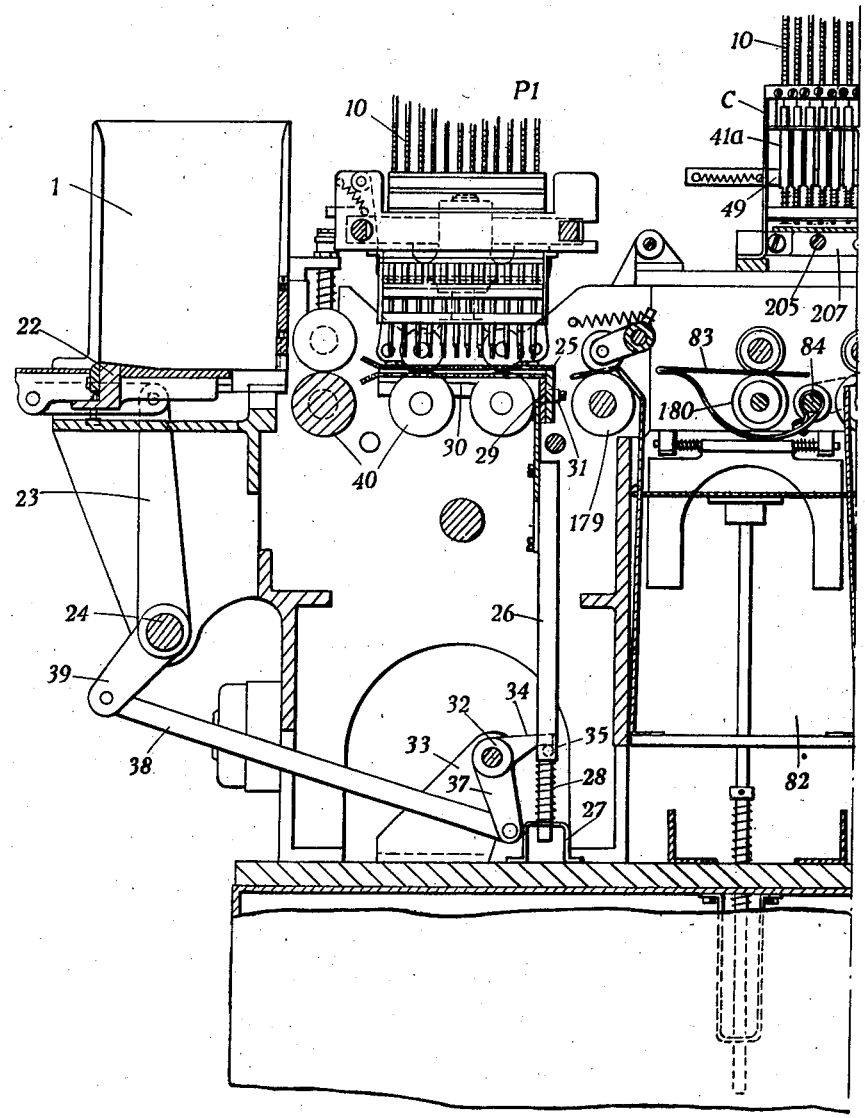

Oct. 21, 1941.  A. THOMAS ET AL  2,260,097
RECORD CARD CONTROLLED STATISTICAL MACHINE
Filed Oct. 7, 1939  15 Sheets-Sheet 10

INVENTORS
A. THOMAS AND N. G. HOLDEN.
BY
ATTORNEY

Oct. 21, 1941.   A. THOMAS ET AL   2,260,097
RECORD CARD CONTROLLED STATISTICAL MACHINE
Filed Oct. 7, 1939   15 Sheets-Sheet 11

INVENTORS.
A. THOMAS AND N. G. HOLDEN.
BY Sydney E. Page.
ATTORNEY

Oct. 21, 1941.     A. THOMAS ET AL     2,260,097
RECORD CARD CONTROLLED STATISTICAL MACHINE
Filed Oct. 7, 1939     15 Sheets-Sheet 12

INVENTORS.
A. THOMAS AND N.G. HOLDEN.
BY
Sydney E. Page.
ATTORNEY

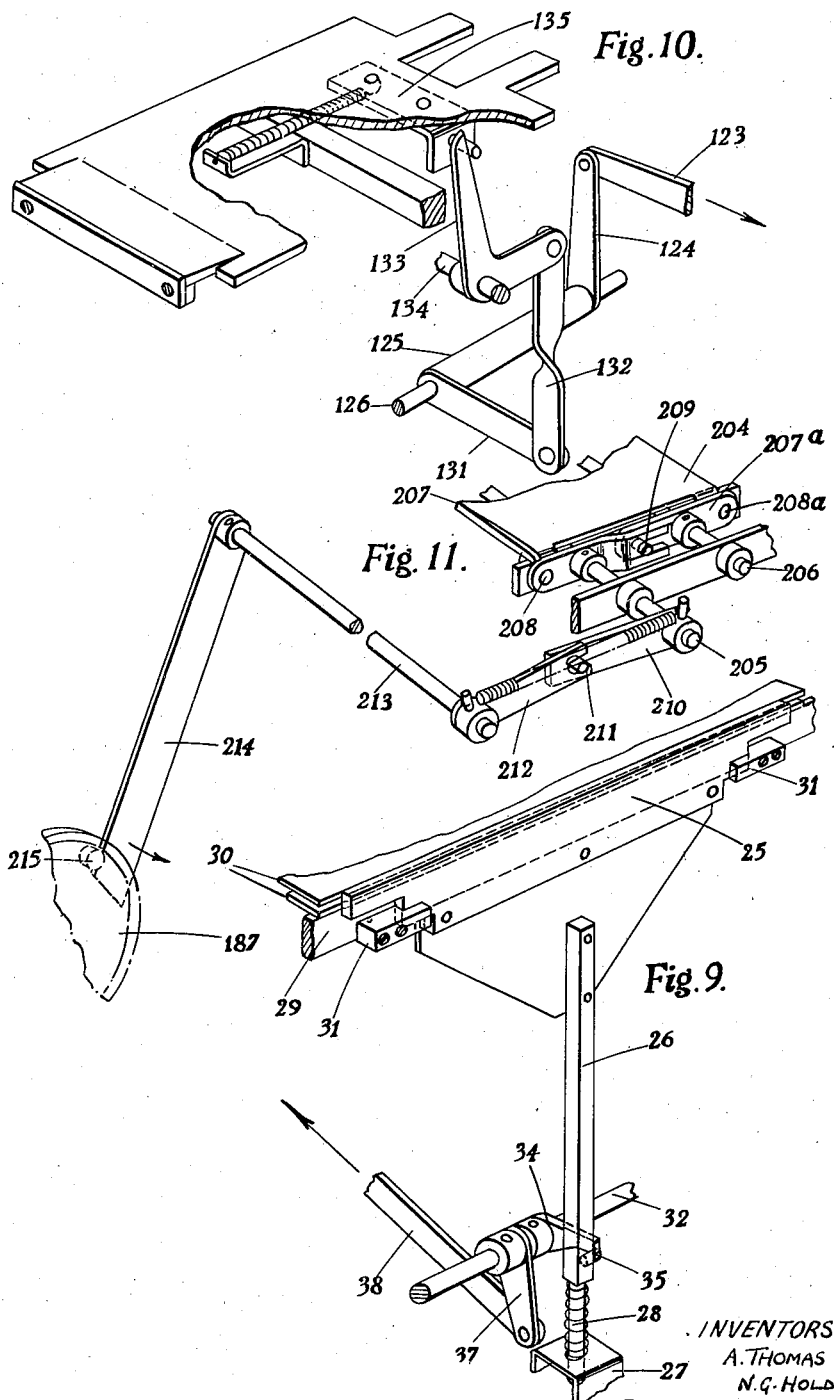

Oct. 21, 1941.   A. THOMAS ET AL   2,260,097
RECORD CARD CONTROLLED STATISTICAL MACHINE
Filed Oct. 7, 1939   15 Sheets-Sheet 15

INVENTORS.
A. THOMAS AND N. G. HOLDEN
BY
ATTORNEY

Patented Oct. 21, 1941

2,260,097

UNITED STATES PATENT OFFICE 2,260,097

RECORD CARD CONTROLLED STATISTICAL MACHINE

Arthur Thomas, Wallington, and Norman Geoffrey Holden, Carshalton, England, assignors to Powers Accounting Machines Limited, London, England, a company of Great Britain Application October 7, 1939, Serial No. 298,524
In Great Britain October 7, 1938

4 Claims. (Cl. 209—110)

This invention relates to record card controlled statistical machines.

In punched card accounting machines practice it is customary at the end of a month to punch for each account a balance card. These balance cards are punched with an account number as well as with the amount of the balance, and are put in numerical order in a file in which they are kept until the end of the next month.

During the month a detail or item card is punched for each transaction and each detail card is also punched with the number of the respective account. At the end of the month these detail cards are sorted into groups, the cards in each group having the same account number, and it is desired to take the balance cards from their file and place the appropriate balance card at the head of each group of detail cards.

The present invention has for its object to provide a machine capable of fulfilling the above function; but is not limited by the nature of the cards with which it has to deal. For example, instead of balance and item cards, other related cards may be employed, which in the present specification will be generally referred to as master and detail cards.

According to the present invention a record card controlled statistical machine comprises in combination a master card magazine and a detail card magazine, each having a card feed mechanism and a sensing mechanism associated therewith, means for comparing the sensings of a contemporaneously sensed master and detail card, and means operative under the control of the comparing means for causing an operation of the master card feed mechanism or of the detail card feed mechanism in accordance with the result of the comparison.

Preferably according to the invention there is provided means, operative under the control of the comparing means, for controlling the two card feed mechanisms in such a way that when disagreement between the compared sensings occurs, feeding from the master card magazine takes place and when agreement between the compared sensings occurs feeding from the detail card magazine takes place.

Preferably also according to the invention the detail cards, after being sensed, are fed into a receiver, and when disagreement immediately follows agreement, the disagreeing master card is fed into the receiver containing the sensed detail cards whereas when disagreement follows disagreement the disagreeing master card is fed into a different receiver.

Conveniently according to the invention means is provided whereby when a master card is fed into the receiver which contains the sensed detail cards, a signal card is fed into the other receiver.

The machine may also, according to the invention, include means associated with the master card sensing means for sensing the presence or absence of a control hole in the cards, manually settable control means for disabling the comparing means and simultaneously placing under the control of said control hole sensing means the signal card feeding means and also the signal card receiver, in such a way that when a control hole is sensed in a card, said card passes into the detail card receiver and a card is fed from the signal card magazine into the signal card receiver, whereby by placing a stack of old balance cards and signal cards in the master card magazine, said signal cards each having the control hole, and a stack of new balance cards in the signal card magazine the signal cards are extracted and delivered to the detail card receiver and the old and new balance cards are amalgamated in correct numerical order and delivered to the signal card receiver.

In order that the invention may be more completely understood a preferred embodiment thereof will be described by way of example with reference to the accompanying diagrammatic drawings in which:

Figures 1 and 1A show the machine in outside elevation;

Figure 2 is an end view from the right hand side of Figure 1;

Figure 1:
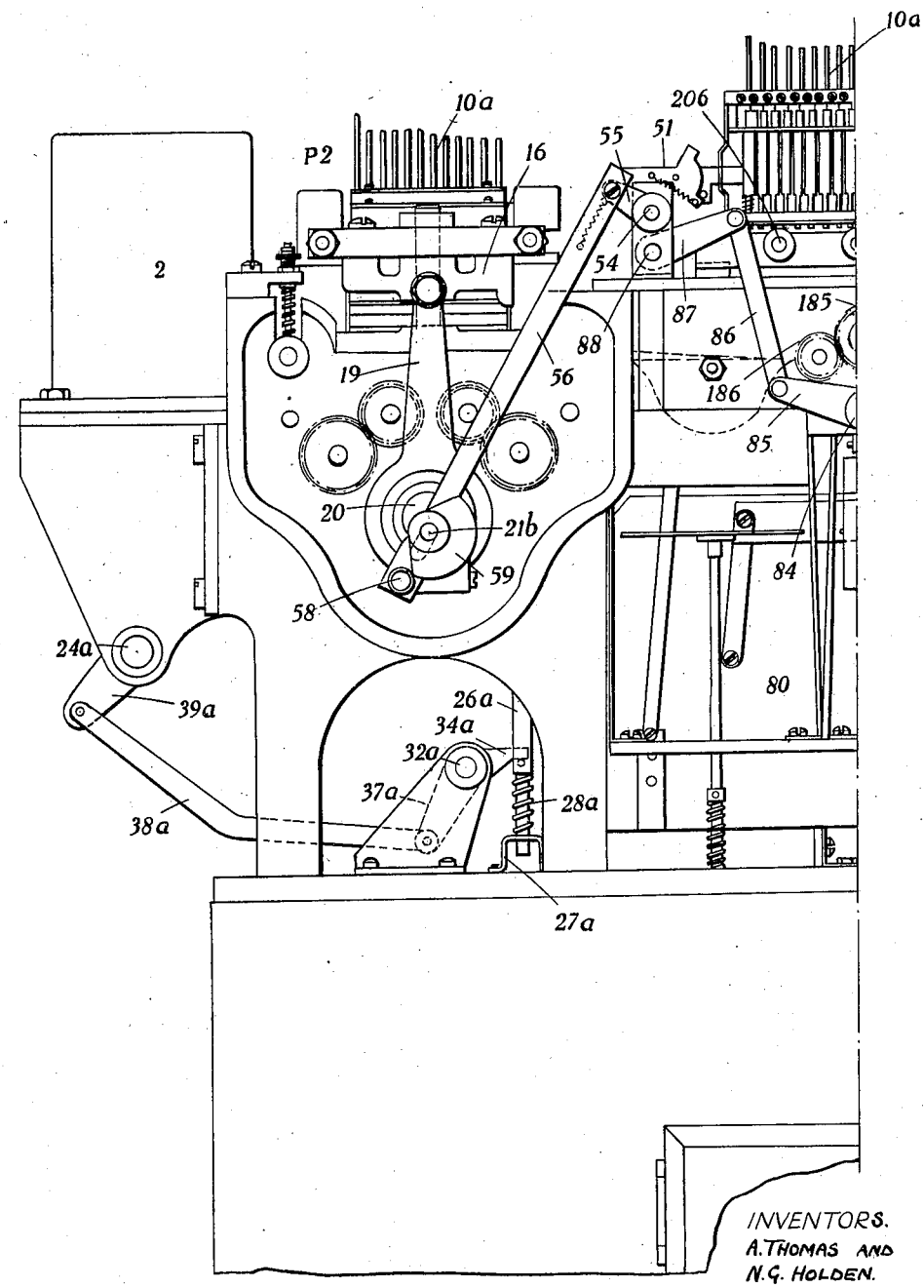
Figure 3A:
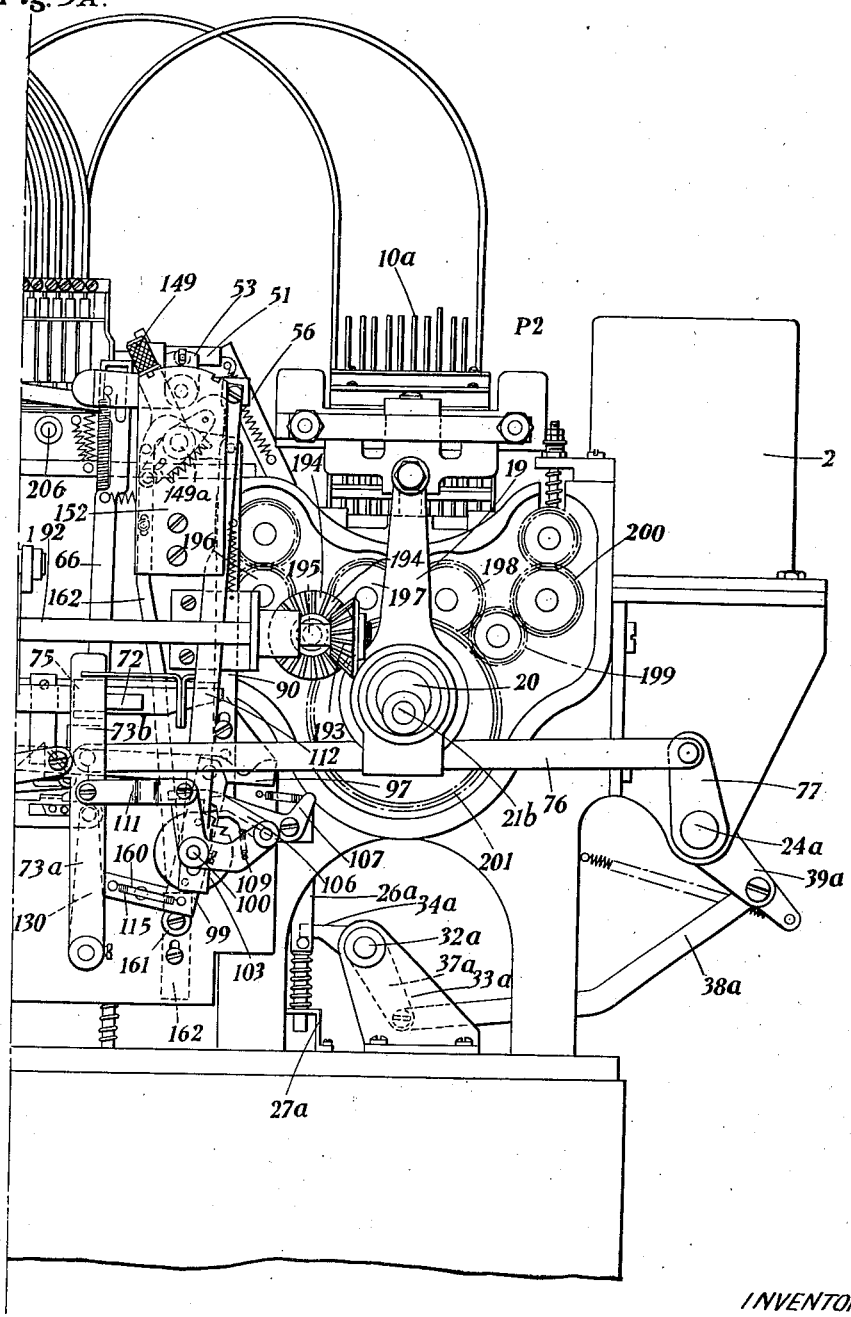
Figure 5:
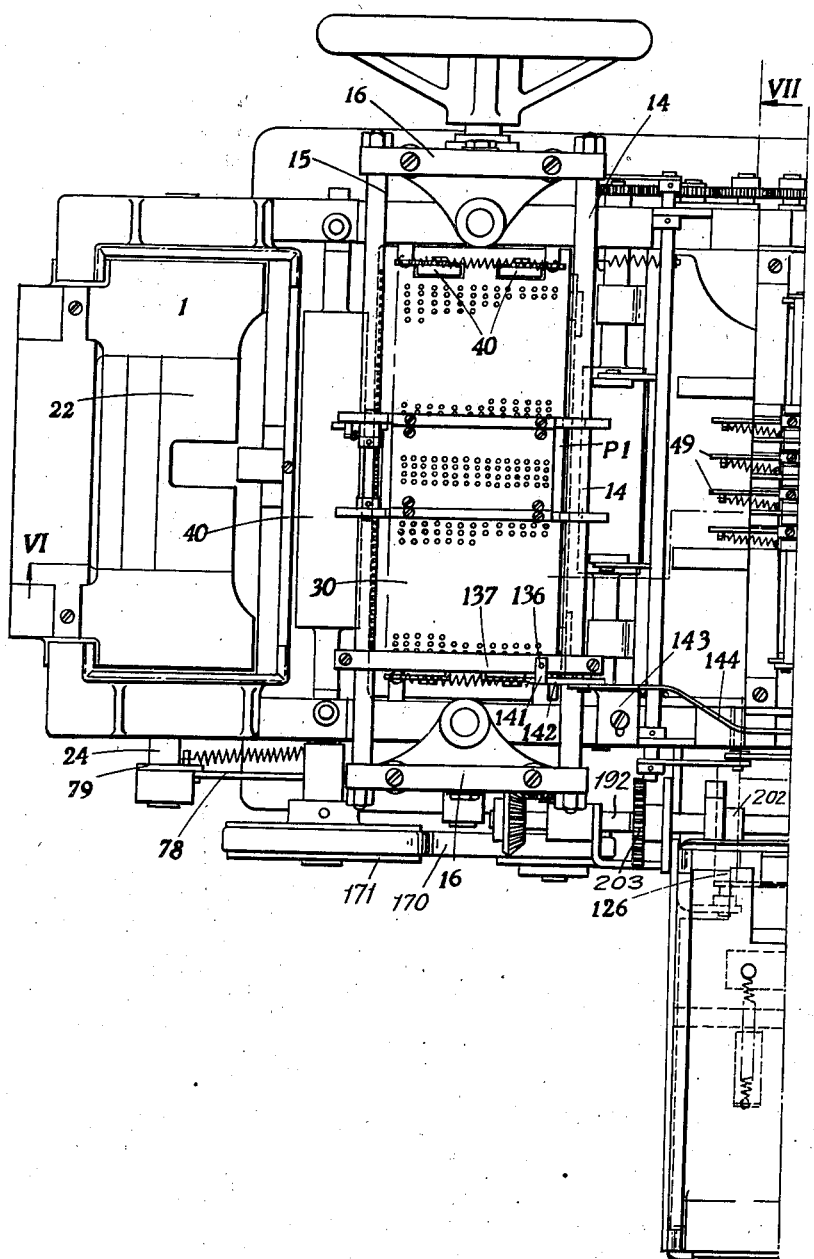
Figure 5A:
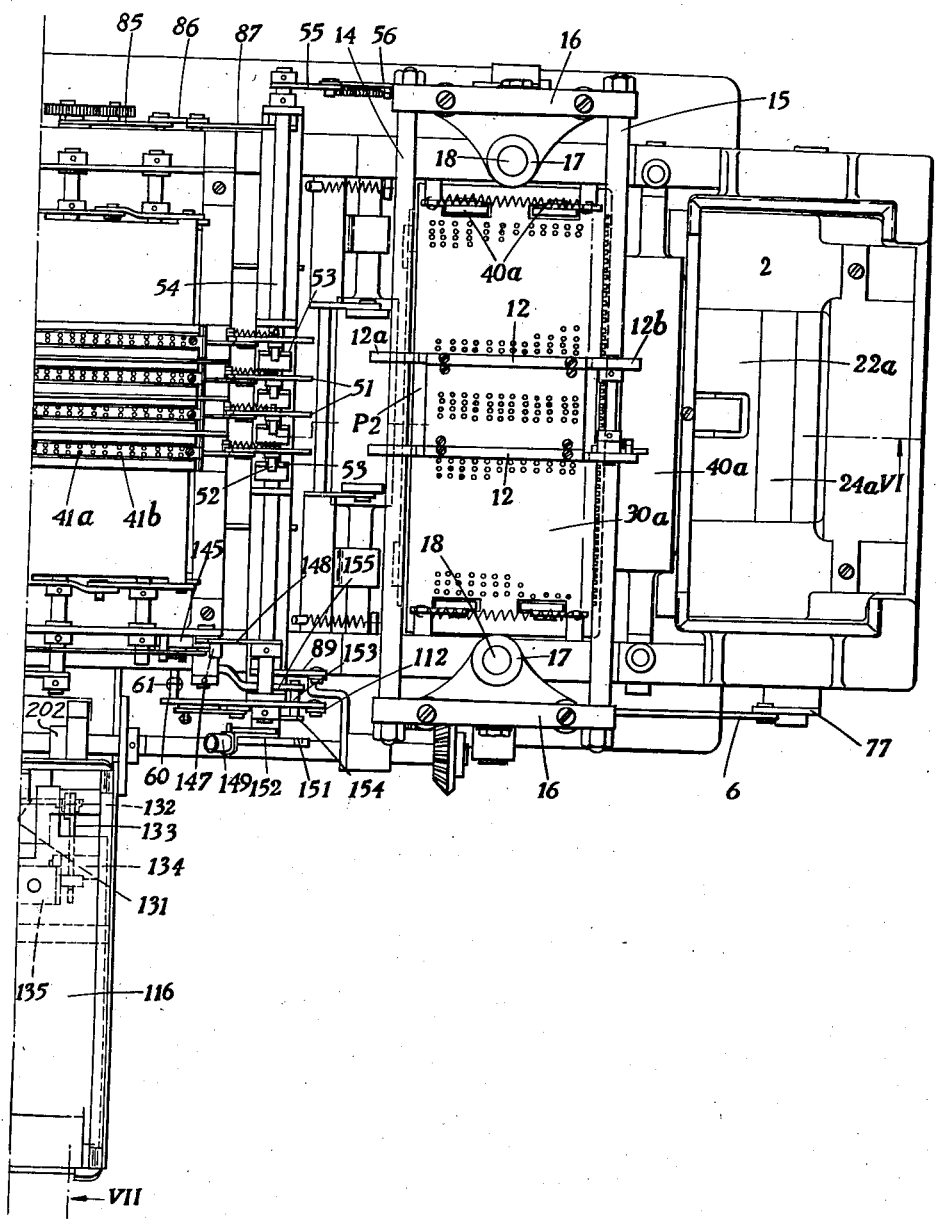
Figure 6A:
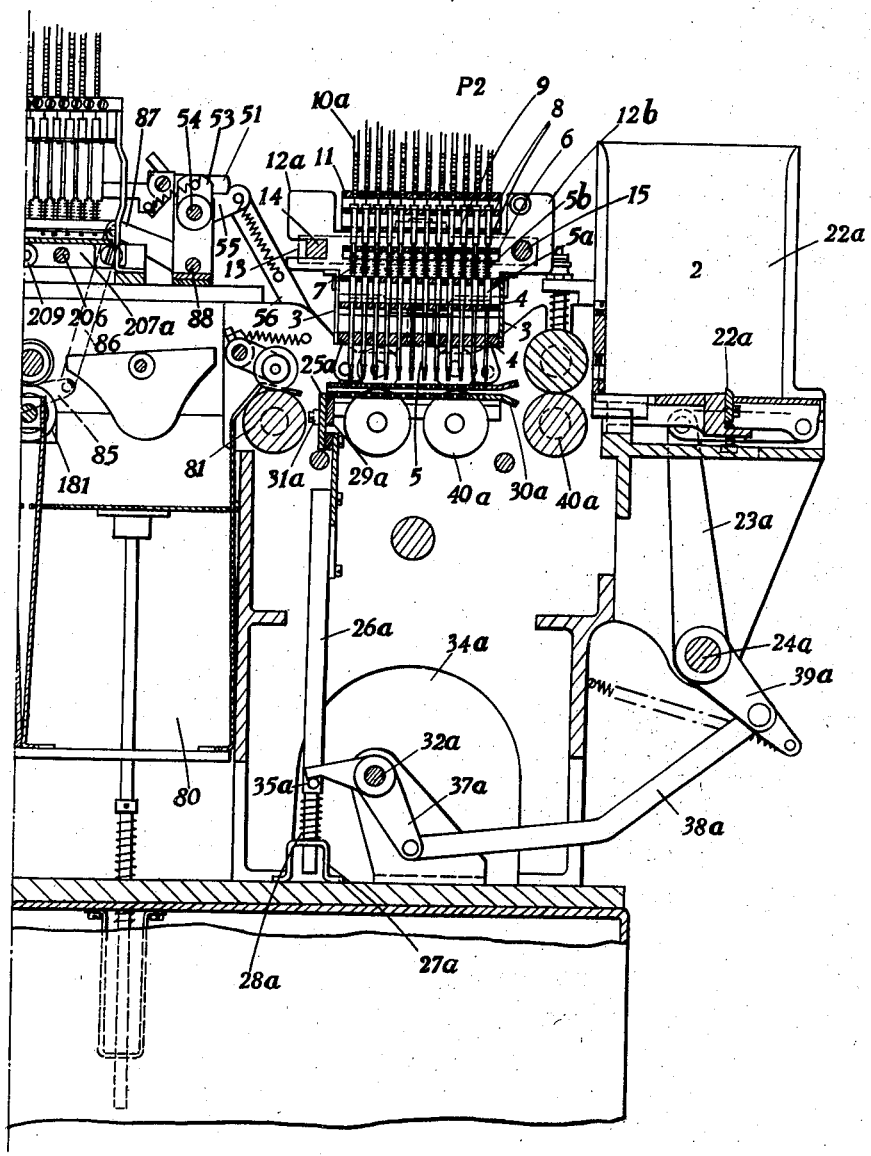
Figure 7:
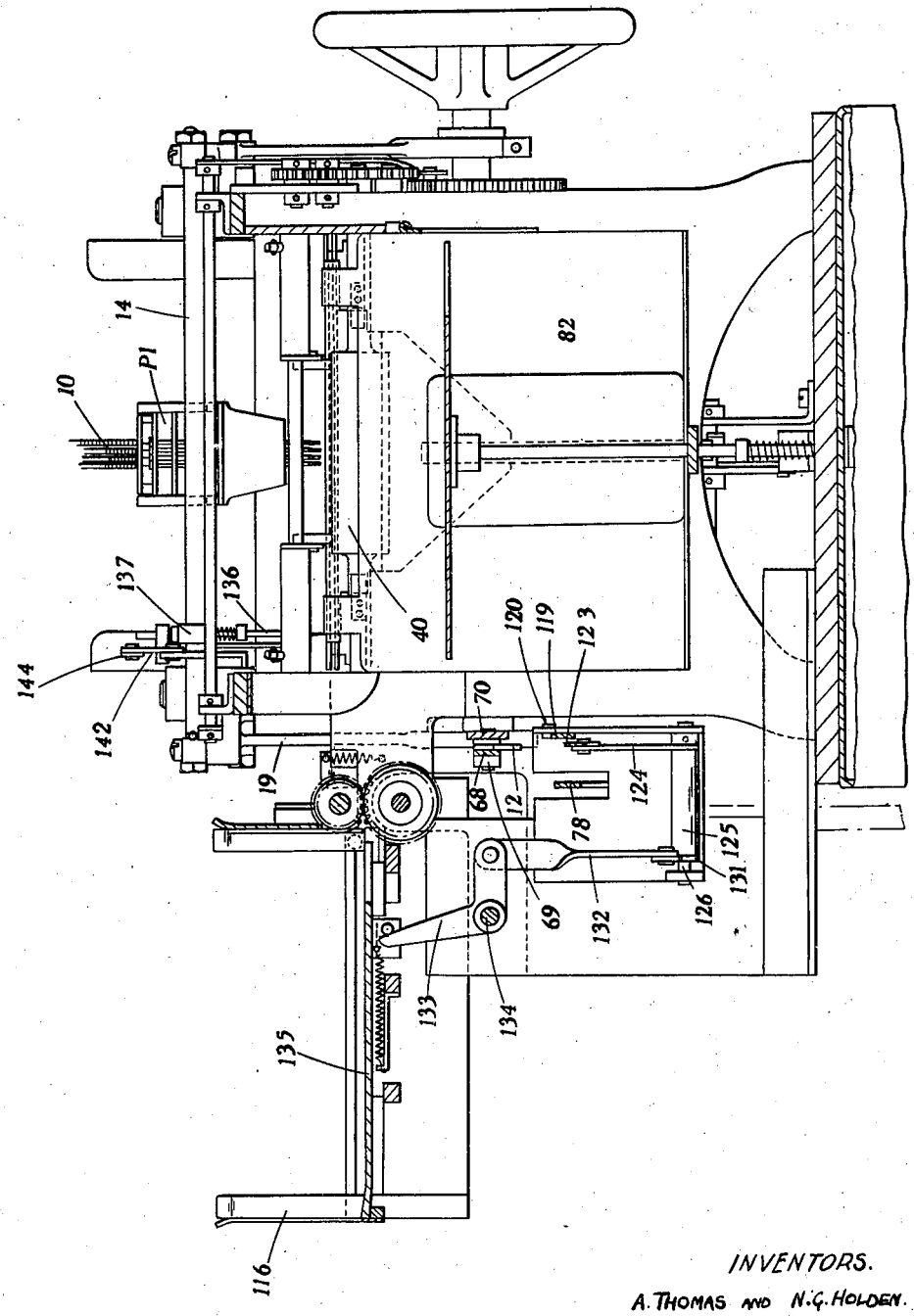
Figure 8:
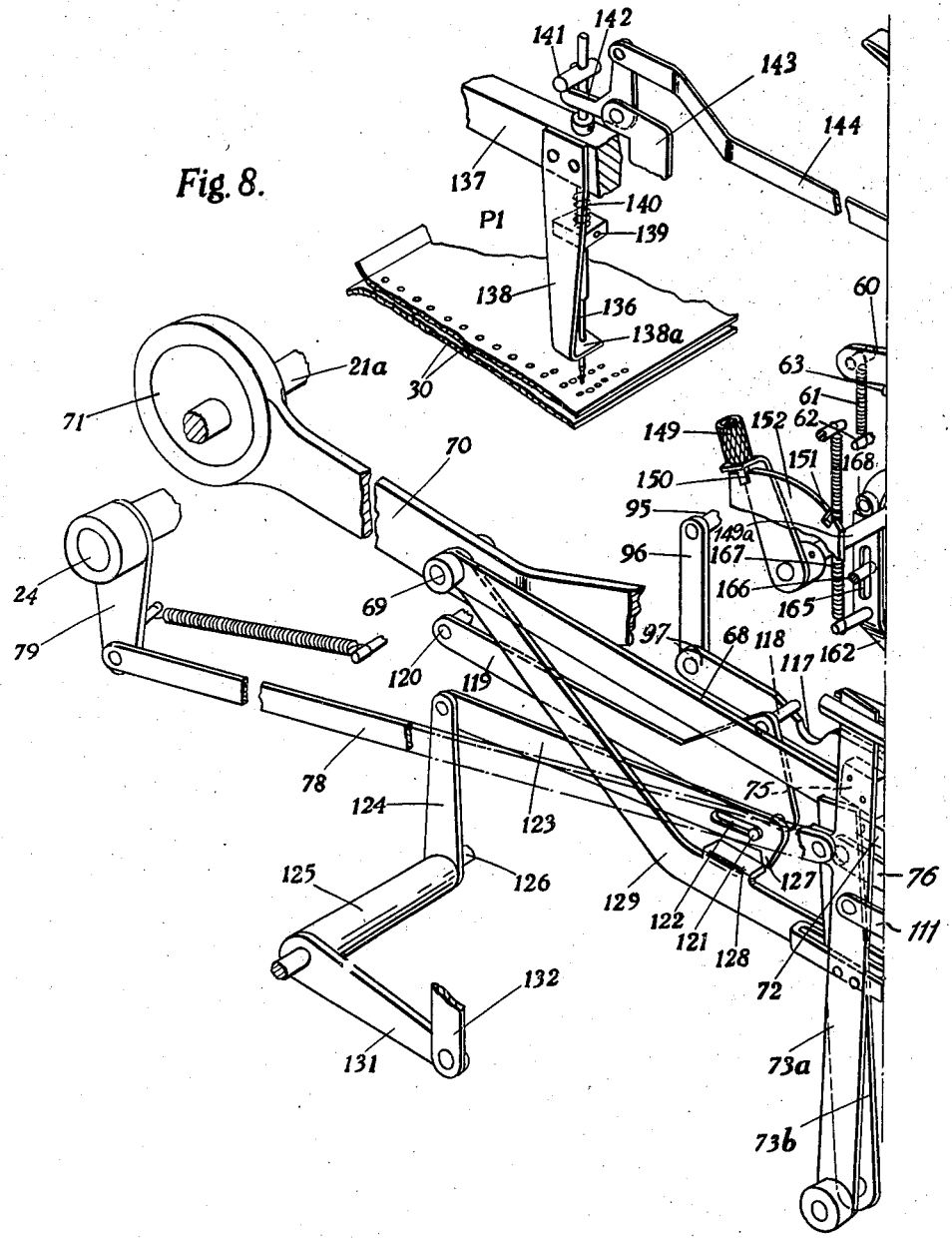
Figure 8A:
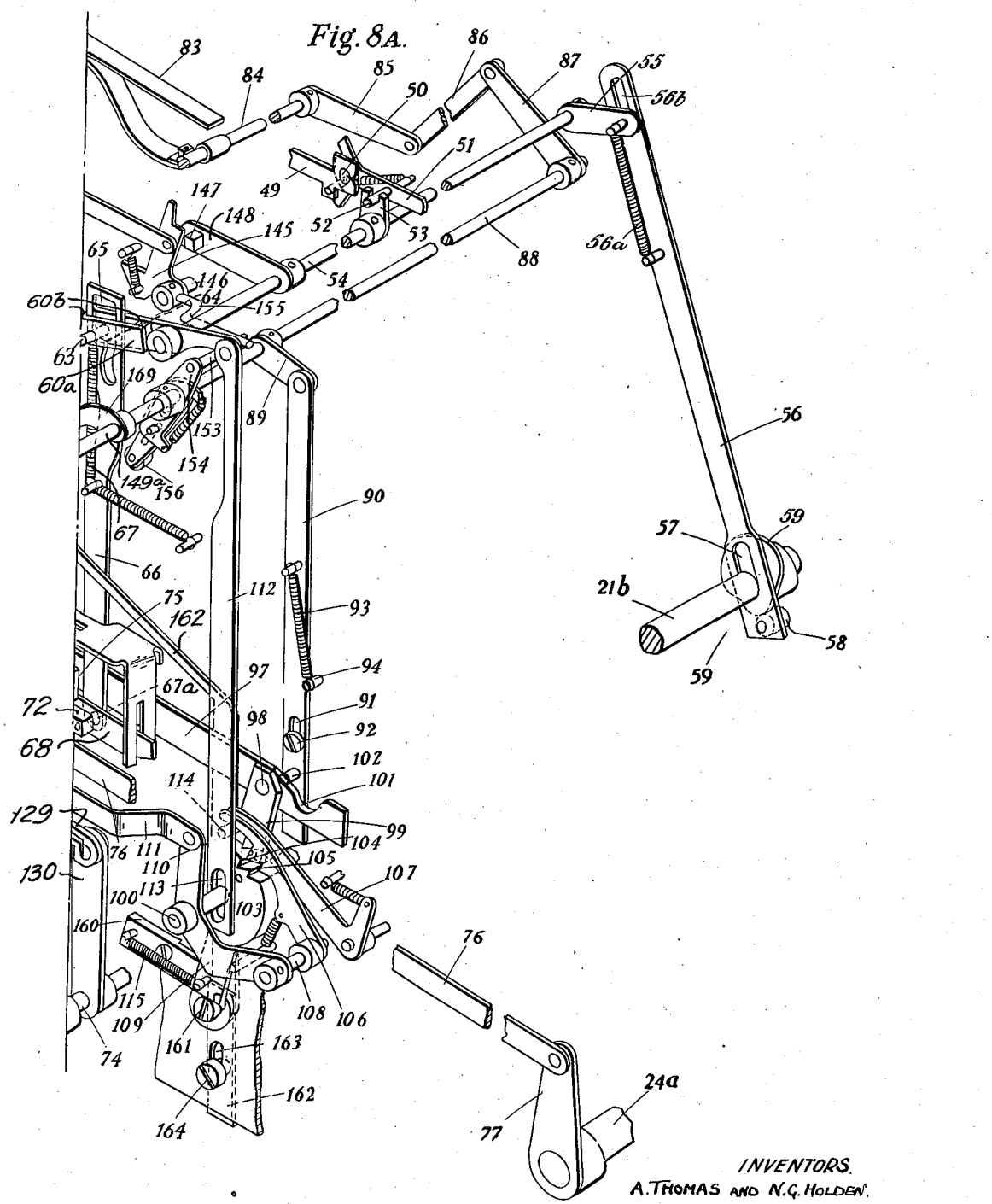

Figures 3 and 3A together constitute an outside elevation of the side opposite to that seen in Figure 1;

Figure 4 is an end view from the right-hand side of Figure 3;

Figures 5 and 5A together constitute a plan;

Figures 6 and 6A together constitute a longitudinal section on the line VI—VI of Figure 5;

Figure 7 is a transverse section on the line VII—VII of Figure 5;

Figures 8 and 8A together constitute a diagrammatic perspective view of the main operating and control mechanism of the machine;

Figure 9 illustrates a detail of the card stop mechanism;

Figure 10 illustrates a detail of the signal card feeding mechanism;

Figure 11 illustrates a further constructional detail; and

Figure 12:
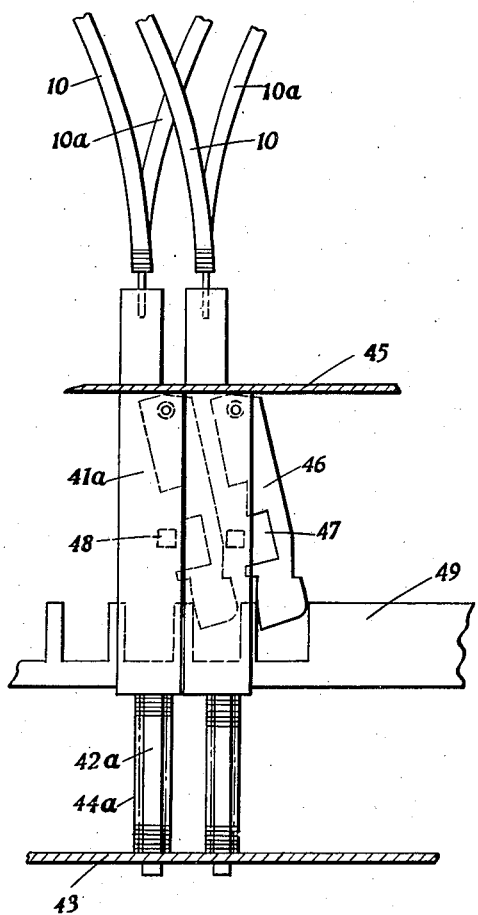
Figure 13:
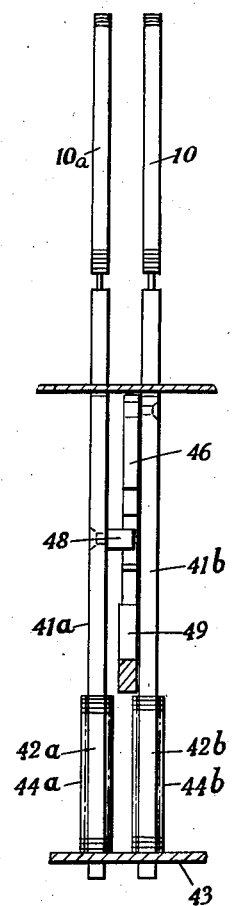

Figures 12 and 13 illustrate a detail of the comparing mechanism to a larger scale, Figure 13 being a view looking at the left of Figure 12.

In this construction the machine includes two card magazines 1 and 2 into one of which (1) balance cards are placed, and into the other of which (2) detail cards are placed. Associated with each magazine is a reciprocating sensing pin box.

These pin boxes are shown at $P_1$ and $P_2$ in the drawings and since the construction of each pin box is identical the construction of only one of the pin boxes will be described herein.

Referring more particularly to Figures 1, 2, 5 and 6, each pin box comprises two end plates 3 connected by horizontal plates 4 provided with holes for the reception of the sensing pins 5. These are ten columns of sensing pins 5, each column comprising twelve pins. Above the upper of the two plates 4 each pin 5 is increased in width at 5a, the lower end of the portion 5a of larger diameter normally resting on the upper plate 4. Above the portion 5a of larger diameter each pin 5 is again reduced in diameter as indicated at 5b, and this reduced portion is guided at its upper end in a transverse plate 6, the reduced portion being surrounded by a spring 7 which by acting on the upper surface of the portion 5a of increased diameter tends to push the pin 5 downwardly.

Disposed above the plate 6 are two plates 8 which serve as guides for plungers 9, there being one plunger disposed above each sensing pin 5. To each plunger is connected the end of the inner wire of a Bowden cable 10, the end of the outer casings of the Bowden cables being attached to a plate 11. For convenience of reference the Bowden cables emanating from the pin box $P_1$ will hereinafter be referred to as the cables 10, and the Bowden cables emanating from the pin box $P_2$ will be referred to as the cables 10a.

Each pin box $P_1$ and $P_2$ also comprises two guide plates 12 having lugs 12a and 12b. The lugs 12a are slotted at 13 to embrace a guide bar 14 and the lugs 12b have holes through which pass a guide rod 15. At each of their ends the guide bar 14 and the guide rod 15 are connected by a casting 16 including a boss 17 guided for vertical reciprocation on a post 18, these posts 18 projecting vertically from the machine frame.

Each pin box is adjustable horizontally on the guides 14 and 15 in the manner described in United States Patent No. 1,866,748 issued July 12, 1932.

Pivoted to each of the castings 16 is an eccentric rod 19 operated by an eccentric 20, there being thus two pairs of eccentrics 20 and eccentric rods 19 to each pin box $P_1$ and $P_2$.

The pair of eccentrics for the pin box $P_1$ are secured to a pin box operating shaft 21a, while the eccentrics 20 for the pin box $P_2$ are secured to a pin box operating shaft 21b.

The cards from the magazine 1 are fed to the pin box $P_1$ by means of a reciprocating picker knife 22, this picker knife being operated by a pair of arms 23 secured to a rocking shaft 24 which is controlled in a manner to be described later.

The card stop 25 for the pin box $P_1$ is secured to a vertical post 26 which is mounted as follows:

The lower end of the post 26 is guided in a bracket 27 and is surrounded by a spring 28 which tends to urge the post and therefore the card stop 25 upwardly. At the upper end a bar 29 is screwed to the underside of the fixed pin plate 30, and two retaining bars 31 are secured to this bar 29 so that the card stop 25 is guided between the bars 29 and 31 (Figure 9).

Secured to a shaft 32 freely mounted in a bracket 33 is an arm 34 engaging a pin 35 on the post 26, and also secured to the shaft 32 is an arm 37 connected by a link 38 to an arm 39 on the shaft 24. Accordingly when the shaft 24 rocks clockwise to feed a card, the shaft 32 is also rocked clockwise to lower the card stop 26 so as to permit the card which is already between the pin plates 30 to be ejected therefrom. The card which has just been fed is conveyed from the magazine 1 to the pin plates 30 by means of feed rolls 40, and the timing is such that the card stop 25 rises again before the entering card reaches it, so that the latter is arrested between the pin plates 30 by the card stop 25.

A similar mechanism is provided in association with the magazine 2, and the corresponding parts have been shown on the drawings with the same reference numerals to which however, the suffix a has been added.

The shaft 24a is rocked under the control of mechanism which will be described later.

Disposed between the two pin boxes $P_1$ and $P_2$ is a comparing device indicated generally at C. For each of the ten columns of sensing pins 5 in the pin boxes there is a column of pairs of comparing elements indicated at 41a and 41b in the drawings. In each column of the comparing unit C, the elements 41a are associated with the sensing pins 5 in the associated column of the pin box $P_1$, while the comparing elements 41b are associated with the sensing pins 5 in the pin box $P_2$.

Each comparing element 41a or 41b has a reduced lower portion 42a, 42b, by which the lower end of the comparing element is guided in a plate 43, a spring 44a, 44b being provided around the reduced portion to urge the comparing element upwardly. At their upper end the comparing elements are guided in plates 45.

The comparing element 41a of each pair is connected to the Bowden cable 10 emanating from the corresponding pin 5 in the corresponding column of the pin box $P_1$, while the comparing element 41b of each pair is connected to the Bowden cable 10a emanating from the corresponding pin in the corresponding column of the pin box $P_2$.

Pivoted to each of the comparing slides 41a is a swinging element 46 (Figures 12 and 13) having a recess 47 formed therein, while the other comparing element 41b of the pair is provided with a projection 48 which when the comparing elements 41a, 41b of a pair are both raised or both lowered, can enter the recess 47 in the associated swinging element 46. Passing transversely of each column of pairs of comparing elements 41a and 41b is a testing comb 49 which is reciprocated longitudinally at each machine operation.

The lower ends of the swinging elements 46 engage with the teeth of the comb 49, so that when the comb is moved to the left all the elements 46 can also swing to the left.

If one comparing slide 41a or 41b of a pair is up and the other is down, or vice versa, then the projection 48 on the one comparing slide 41a will be out of register with the recess 47 in the swinging element 46 pivoted to the other comparing slide 41b, and consequently the testing comb 49 will be unable to move. On the other hand if both comparing slides 41a, 41b of a pair are in the same position, either up or down, then the projection 48 on the one slide will be in register with the recess 47 in the swinging element 46 pivoted to the other slide and the testing comb 49 will be able to move.

It will be seen that since the two comparing slides 41a, 41b of a pair are set through the Bowden cables 10, 10a from corresponding sensing pins in the two sensing pin boxes $P_1$, $P_2$, the relative positions of the two comparing slides 41a, 41b, will depend upon whether there is agreement or disagreement between the two cards simultaneously sensed by the two pin boxes as regards the particular hole position on the cards corresponding to the pair of comparing elements concerned.

When the machine is first started, there is no card in either pin box and, therefore, during the first cycle of operation of the pin boxes when the two pin boxes descend, all the pins thereof find a hole and there is complete agreement between the results of the sensing operations performed by the two pin boxes. Accordingly, all the testing combs 49 for the ten columns of the comparing unit are able to move.

Each testing comb has pivoted to its right-hand end at 50 a latch 51 having a pin 52 which when the latch is in the position shown in Figure 8A is in engagement with a forked arm 53 secured to a shaft 54. The shaft 54 has secured to its right-hand end an arm 55 pivoted to a link 56 which at its lower end is guided on the shaft 21b by means of a slot 57 and carries a roller 58 engaging with a cam 59 secured to the shaft 21b.

At its left-hand end the shaft 54 has secured thereto an arm 60 to which is attached a spring 61 anchored to the machine frame at 62. This spring 61 therefore tends to rock the shaft 54 counterclockwise (Figure 8A) thereby maintaining the roller 58 in contact with the cam 59.

When the shaft 54 rocks, the comb bars 49 of which the latches 51 are engaged with the associated forked arm 53 will also tend to move. By raising any latch 51 about its pivot 50 from the position shown in Figure 8, the associated testing comb 49 can be disconnected from the shaft 54 thereby rendering the associated column of comparing elements 41a, 41b inoperative.

It may here be mentioned that for convenience of reference the shaft 54 will hereinafter be referred to as the card feed control shaft.

Fixed to the arm 60 is a plate 60a spaced from the arm by spacers 60b to form a guide for the upper end of a vertical link 66 having a slot 65 formed with a shoulder 64. Projecting from the arm 60 is a pin 63 which passes through the slot 65 and through plate 60a, the outer end of pin 63 forming an anchor for a spring 67 which normally holds the pin 63 against a shoulder 64 of the slot 65. Thus when the shaft 54 rocks counterclockwise the pin 63 will depress the link 66.

The lower end of the link 66 is pivoted at 67a to a link 68 which is pivoted at 69 to an eccentric rod 70 operated by an eccentric 71 secured to the shaft 21a.

Figures 8 and 8A show the position of the parts after the shaft 54 has rocked counterclockwise, and in this position the link 66 is depressed to its fullest extent. In this position of the link 66 a block 72 on the link 68 is in register with the upper end of an arm 73b freely mounted on a shaft 74.

If the shaft 54 has not rocked counterclockwise, then the link 66 will be in its uppermost position and will have raised the link 68 until the block 72 is in register with a block 75 secured to an arm 73a freely mounted on the shaft 74.

At each sensing operation the cam 59 releases the link 56, arm 55 and shaft 54 to the action of spring 61 which is attached to arm 60 secured to shaft 54. If agreement exists between the contemporaneously sensed cards then comb 49 will be free to be actuated by shaft 54 so that when link 56 is released by cam 59 said shaft 54 will be permitted to rock counterclockwise to the position shown in Figures 8 and 8A, under the action of spring 61. Therefore the block 72 is in register with the upper end of the arm 73b so that when the eccentric rod 70 is moved to the left (Figure 8 position) the block 72 rocks the arm 73b to the left (position shown in Figure 8). The arm 73b is connected by a link 76 to an arm 77 secured to the shaft 24a which operates the picker 22a for the magazine 2, and also the card stop 25a for the pin box $P_2$. Accordingly when agreement occurs a card is fed to the pin box $P_2$ which senses the detail card.

At the same time the card stop 25a which was in its uppermost position, thereby holding the preceding card in the pin box $P_2$ is lowered to release this card and then raised again to arrest the newly fed card.

If disagreement between the sensed cards occurs the comb 49 will be unable to move and consequently spring 61 will be unable to rock shaft 54 counterclockwise to the position shown in Figures 8 and 8A when cam 59 releases link 56. In order to prevent roller 58 from chattering on the cam 59 when shaft 54 is thus prevented from rocking, lost motion is provided between link 56 and arm 55 by means of slot 56b in link 56 engaging a pin (not shown) in arm 55. A spring 56a connected between link 56 and arm 55 keeps the roller 58 up to the cam 59 even though shaft 54 is prevented from rocking, the slot 56b and associated pin permitting the movement of link 56 relatively to arm 55. Accordingly when disagreement occurs the link 66 remains in its uppermost position, so that the block 72 remains in register with the block 75 on the arm 73a. Accordingly when the link 70 moves to the left the arm 73a is rocked to the left and by means of a link 78 connecting the arm 73a to an arm 79 on the shaft 24 rocks the latter.

When the shaft 24 is thus rocked a card is fed from the master card magazine 1 to the master card sensing pin box $P_1$ by means of the picker 22, and at the same time the card stop 25 is operated to release the preceding card and arrest the newly fed card.

Thus, if there is agreement between two cards, the card feed control shaft 54 is rocked and a card is fed from the detail card magazine 2 to the detail card sensing pin box $P_2$. At the same time the detail card stop 25a is lowered thereby permitting the agreeing detail card to leave the pin box $P_2$. On the other hand if the card feed control shaft 54 is prevented from rocking by disagreement between two cards, a card is fed from the balance card magazine 1 to the balance card sensing pin box $P_1$, and the balance card stop 25 is lowered permitting the disagreeing balance card to leave the balance card pin box.

When agreement occurs between two cards the detail card which caused the agreement, on leaving the pin box enters a receiver 80 to which it is conveyed by feed rolls 81.

As long as successive detail cards agree with the balance card which is in the balance card pin box $P_1$, the said balance card will remain in the balance card pin box since the balance card stop 25 is held up. As soon, however, as a detail card enters the detail card sensing pin box $P_2$ and disagrees with this balance card, it is desired to feed this balance card into the same receiver 80 as the preceding detail cards and at the same time to feed into the balance card pin box $P_1$ the next succeeding balance card. If this next succeeding balance card still disagrees with the detail card sensing, it is desired to feed this disagreeing balance card into a reject box. To this end, a reject box 82 is disposed between the card receiver 80 and the balance card sensing pin box 20 $P_1$ and this reject box has a shutter 83 which is normally open.

The shutter 83 is secured to a spindle 84 having secured thereto an arm 85 connected by means of a link 86 to an arm 87 secured to a shaft 88. To the shaft 88 is secured an arm 89 to which is pivoted a vertical link 90 guided near its lower end by means of a slot 91 engaging a screw 92 secured to the machine frame. A spring 93 attached to the link 90 and anchored to the machine frame at 94 urges the link 90 downwardly.

Pivoted to the machine frame at 95 is an arm 96 to the lower end of which is pivoted a horizontal link 97. Pivoted to the link 97 at 98 is a lever 99 secured to a shaft 100, and formed in the link 97 at its right-hand end is a recess 101 with which can cooperate a pin 102 on the link 90.

Secured to the shaft 100 is a disc 103 having two teeth 104, 105 cut therein. Co-operating with these teeth are two pawls one of which is an actuating pawl 106, and the other is a detent pawl 107. The feed pawl 106 is pivoted on a rod 108 secured to an operating arm 109 which is freely mounted on the shaft 100 and has an extension 110 connected by a link 111 to the arm 73a.

Secured to an extension of the arm 60 is a vertical link 112 guided at its lower end by means of a slot 113 embracing the shaft 100, and this link 112 carries a pin 114 which lies beneath the free ends of the two pawls 106 and 107. When agreement between two cards occurs, the card feed control shaft 54 rocks counter-clockwise to the position shown in Figure 8A, whereby the link 112 is raised and lifts the pawls 106, 107 clear of the teeth 104 and 105 on the disc 103, so that the pawls do not operate. This position is shown in Figure 8A.

On the other hand if disagreement occurs the link 112 is not lifted and the pawls remain in engagement with the teeth on the disc 103. Since disagreement results in the feeding of a card from the balance card magazine 1 the operating arm 73a for the balance card picker 22 will rock to the left in Figure 8 and will actuate the pawl 106 thereby stepping the disc 103 round one tooth. This movement of the disc 103 acting through the lever 99 moves the horizontal link 97 to the left into a position such that the recess 101 therein comes into register with the pin 102 on the link 90 which controls the shutter 83 for the reject box 82. Consequently this link 90 is permitted to drop under the action of the spring 93 and closes the shutter 83 so that the disagreeing balance card passes over the reject box 82 and enters the same box 80 as the detail card. If now the next balance card also disagrees the card feed control shaft 54 will fail to rock and the pawl 106 will be allowed to operate a second time, thereby stepping the disc 103 round one more tooth, whereby the horizontal link 97 will be moved still further to the left into a position such that the recess 101 is beyond the pin 102. Consequently the link 90 is cammed up by engagement of the inclined shoulder of slot 101 with pin 102 and the shutter 83 is held open, so that the second disagreeing balance card goes into the reject box 82.

If the next following balance card still produces disagreement the resulting movement of the pawl 106 does not move the toothed disc 103 as the latter is only provided with two teeth. The detent pawl 107 however, holds the disc 103 in the operated position by engagement with the tooth 105.

On the first occurrence of agreement after disagreement the pawls 106, 107 are lifted clear of the disc 103 by the rocking of the card feed control shaft 54 as described above, and the disc is returned to its normal position by a spring 115.

When a balance card is fed into the same box 80 as the detail card, i. e. on the occurrence of the first disagreement immediately following agreement, it is desired to feed a signal card from a signal card magazine 116 into the reject box 82, and to this end the horizontal link 97 has a second recess 117 formed therein, so positioned that when on the first occurrence of disagreement after agreement the disc 103 is stepped round one tooth, this second recess 117 in the horizontal link 97 comes into register with a pin 118 on an arm 119 controlling the feed of cards from the signal card magazine 116.

The arm 119 is pivoted to the machine frame at 120 and carries a further pin 121 engaging in a slot 122 in a link 123 pivoted to an arm 124 secured to a sleeve 125 freely mounted on a shaft 126. The link 123 has a hook end 127 which is normally held above a lug 128 by engagement of the pin 118 with the upper edge of the link 97. When, however, the link 97 moves to the left to bring the recess 117 into register with the pin 118, the arm 119 drops under the action of a spring not shown, whereby the hook 127 engages a lug 128 on a link 129 pivoted to the eccentric rod 70 and 69, and its other end to an arm 130 freely mounted on the shaft 74.

When the eccentric 71 moves the rod 70 to the right, the link 129 is also moved to the right and the lug 128 by engagement with the hook 127 will pull the link 123 to the right, thereby rocking the sleeve 125 clockwise.

Secured to the sleeve 125 is a second arm 131 connected by a link 132 to a bell crank 133 pivoted to the machine frame 134 and also to the signal card picker 135 (Figure 10). By this means when the link 97 moves to the left on the first occurrence of disagreement after agreement the signal card picker is operated to feed a signal card into the reject box 82.

Thus, at the end of the operation of the machine the receiver 80 contains the groups of detail cards in order, each group being followed by its respective balance card. In the reject box 82 there are the balance cards for which there were no corresponding detail cards together with signal cards corresponding to the balance cards which were extracted from the balance card file and placed at the head of the respective groups of detail cards.

The detail cards with their balance cards are put through the tabulator for the purpose of preparing the account statements and the tabulator prepares a new balance card for each group which is punched with the group designation and with the amount of the new balance.

After the new balance cards have been prepared by the tabulator it is desired to insert them in the proper order into the pack of old balance cards contained in the reject box 82, at the same time removing from this pack the signal cards which were inserted therein.

To this end the balance card sensing pin box $P_2$ is provided with a control sensing pin 136 which is mounted as follows:

The pin 136 is guided at its upper end in a bar 137 (Fig. 8) of the pin box $P_2$ and at its lower end in a lug 138a projecting from a bracket 138 attached to the bar 137. Secured to the pin 136 is a block 139 and between this block and the bar 137 is mounted a spring 140 which urges the pin 136 downwardly. At its upper end the pin carries a projection 141 overlying a bell crank 142 pivoted to a bracket 143 on the machine frame, the bell crank 142 being connected by a link 144 to a latch 145 pivoted to the machine frame at 146, and co-operating with a lug 147 on an arm 148 fixed to the card feed control shaft 54.

Secured to a shaft 149a coaxial with, but separate from, the shaft 88 is a control handle 149 which when the machine is set for comparing master and detail cards is in the position shown in the drawings. When it is desired to replace the signal cards in the pack taken from the reject box 82 by new balance cards however, the control handle 149 is moved over until the tooth 150 thereon engages the notch 151 in the plate 152. When the control handle 149 is in the position shown in Figure 8 a pin 153 on an arm 154 secured to the shaft 149a is holding up a pin 155 secured to the boss of the latch 145, so that the latch 145 is prevented from co-operating with the lug 147. When the control handle 149 is moved to the right in Figure 8 so that its tooth 150 engages with the recess 151, the lever 154 on shaft 149a is rocked clockwise thereby withdrawing the pin 153 from beneath the pin 155. If now the control sensing pin 136 finds a hole in a card it will descend to the fullest extent and the projection 141 thereon will rock the bell crank 142 counterclockwise thereby pulling the link 144 to the left and holding the latch 145 out of engagement with the lug 147. The shaft 54 will therefore be free to rock.

If on the other hand the pin 136 does not find a hole it will be prevented from descending to the fullest extent, and the latch 145 will engage with the lug 147 when the shaft 54 rocks clockwise and will prevent this shaft rocking back in the counter-clockwise direction.

The clockwise movement of the lever 154 brought about by the movement of the control handle 149 just described brings a roller 156 carried by the lever 154 into engagement with the link 66, and pushes this link over to the left so that the shoulder 64 is moved away from the pin 63 so that the latter rocks idly in the block 65 and does not move the link 66 when the shaft 54 rocks. Accordingly the control of the card feed by the shaft 54 is then interrupted.

Consequently when the control handle 149 is moved into the position in which its tooth 150 engages with the recess 151 the link 66 remains in its uppermost position and the link 68 also remains in its uppermost position in which the block 72 remains in register with the block 75 so that at each reciprocation of the link 68 the arm 73a is rocked whereby a card is fed from the balance card magazine I to the pin box $P_1$ at each machine cycle. The card picker for the detail card magazine 2 will however be entirely inoperative.

When it is desired to replace the signal cards in the pack of balance cards taken from the reject box 82, by new balance cards the latches 51 are disengaged from the forked members 53 so that the card feed control shaft 54 is no longer influenced by the comparing mechanism C.

As already described a toothed disc 103 is provided with which co-operate two pawls 106 and 107 pivoted to an operating arm 109 actuated by the arm 73a which controls the picker for the balance card magazine I.

Since after movement of the control handle 149 as described above the arm 73a operates to feed a balance card at every card cycle, the pawls 106 and 107 will also be operated at every card cycle. It will be remembered, however, that when the card feed control shaft 54 is rocked the pawls 106 and 107 are lifted clear of the teeth 104 and 105 and therefore operate idly. Thus when a balance card enters the pin box $P_1$ and the control sensing pin 136 is in the operative condition the balance card holds up the pin 136 and the card feed control shaft 54 is therefore not rocked since the latch 145 engages the lug 147. Accordingly the pawl 106 is operative to feed the disc 103 one tooth.

Each of the signal cards however, is provided with a control hole in a position to be sensed by the pin 136, and accordingly when a signal card is in the pin box $P_1$ the pin 136 will be able to descend to its fullest extent and the latch 145 will be withdrawn from the lug 147, whereby the card feed control shaft 54 will be rocked and by means of the link 112 the pawls 106 and 107 will be lifted clear of the disc 103 and will be inoperative to feed the disc.

A fixed stop 160 is provided against which the lower end of the arm 99 is normally held by the spring 115, this stop being in a position such that it maintains the disc 103 in position for the pawls 106 and 107 to engage the first tooth 104.

When the disc is in this position as already described, the horizontal link 97 to which it is connected, is in a position such that it maintains the shutter 83 of the reject box 82 open, whereas when the disc 103 has been stepped round one tooth from the normal position the recess 101 in the horizontal link 97 is below the pin 102 on the control link 90 for the shutter and, therefore, the shutter 83 is permitted to close. When the disc is stepped round to the second tooth 105, the horizontal link 97 moves to a position in which the recess 101 is beyond the pin 102 on the control link 90 and the shutter 83 is opened again.

Thus, when the disc 103 is in its normal position, a card fed from the balance card magazine I will enter the reject box 82. When the disc has been stepped one tooth from the normal position, the reject box is closed and a card fed from the balance card magazine will enter the receiver 80 which is beyond the reject box. On the other hand, when the disc 103 has been stepped to its second position, the reject box 82 is open again and a card fed from the balance card magazine will enter the reject box.

In employing the machine for the purpose of amalgamating the new balance cards with the balance cards which are already mixed with signal cards the pack of balance cards and signal cards is placed in the balance card magazine 1, these cards being in numerical order, while the new balance cards are placed in the signal card magazine 116, these cards being also in numerical order. In addition, a blank card is placed at the bottom of the pack in the balance card magazine and another card which may be blank or may be a signal card is placed at the bottom of the pack in the signal card magazine.

The operation of the machine will now be described on the assumption that the cards in the balance card magazine are numbered 1 to 5, and that the 3rd and 5th cards are signal cards, there being of course, the blank card below card No. 5. Since the 3rd and 5th cards are signal cards there will be in the signal card magazine 116 new balance cards numbered 3 and 5 which are to be substituted for these signal cards, and below these two new balance cards there will also be in the signal card magazine a dummy or blank card.

When the machine is started up on the first sensing cycle there is no card in the balance card sensing pin box $P_1$ and accordingly the control pin 136 operates as if it were sensing a card having a hole, therefore, the pawls 106, 107 are lifted clear of the toothed disc 103 and the latter remains against the normal fixed stop 160.

On the next cycle the blank card is fed into the pin box $P_1$ from the balance card magazine 1 and this holds up the control pin 136 so that the card feed control shaft 54 does not rock, and therefore the pawl 106 feeds the disc 103 one step with the result that the reject box shutter 83 is closed and the blank card passes into the receiver 80.

As already described when the mechanism is set so that the reject box shutter 83 is closed the signal card magazine picker 135 is rendered operative and therefore during this second cycle in which the blank card passes into the receiver the bottom card is fed out from the signal card magazine into the reject box 82, this bottom card being the dummy card referred to above.

It is desired to prevent the disc 103 from returning to the normal stop 160 and to this end a spring loaded stop 161 is provided which is brought into operation when the manual control 149 is set. This stop 161 is carried on a slide 162 guided at its lower end by a slot 163 engaging a fixed screw 164 and at its upper end by a slot 165 engaging a fixed pin 166, a spring 167 urging the slide 162 upwards. When the control handle 149 is in the position shown in the drawings the slide 162 is held down by a roller 168 on an arm 169 secured to the shaft 149a. Movement of the handle 149 to the right releases the slide 162 to the action of the spring 167 but the slide does not immediately rise since the stop 161 is abutting on the lower end of lever 99. When, however, the disc 103 is moved round one tooth the end of the lever 99 leaves the stop 161 and the spring 167 pulls the slide 162 upwards, thereby moving the stop 161 in front of the normal stop 160 and acts to prevent the disc 103 returning to normal, so that when the pawls are released the disc will be held by this spring loaded stop 161 in the position in which the shutter 83 of the reject box 82 is held closed.

At the third cycle card No. 5 which is a signal card is fed into the pin box $P_1$ and since this has a hole the pawls 106, 107, are released but the spring loaded stop 161 prevents the disc 103 from returning to the normal position. Accordingly the reject box shutter 83 remains closed and the signal card No. 5 passes into the receiver 80, at the same time the new balance card No. 5 is fed from the signal card magazine 116 into the reject box 82.

At the next cycle card No. 4 is fed from the balance card magazine 1 and this card is a balance card which therefore has no control hole, and accordingly the pawls 106, 107 are not released. Therefore the disc 103 is fed round to its second step with the result that the reject box shutter 83 is opened again and accordingly balance card No. 4 goes into the reject box 82 on top of the new balance card No. 5 which came from the signal card magazine 116.

Card No. 3 which is a signal card is then fed from the balance card magazine 1 and since this card has a hole the pawls 106 and 107 are released and the disc 103 springs back to the spring loaded stop 161, whereby the reject box shutter 83 is closed so that the signal card No. 3 passes into the receiver 80 on top of signal card No. 5. At the same time new balance card No. 3 is fed from the signal card magazine 116 on top of balance card No. 4 in the reject box 82.

Card No. 2 is then fed from the balance card magazine 1 and this card being a balance card has no hole so that the disc 103 is fed to its second position and the reject box 82 opens to permit the balance card No. 2 to enter. Likewise the next card No. 1 is a balance card and this causes the pawl 106 to operate, but since the disc 103 is already at its second step it merely remains there being retained by the detent pawl 107, so that the reject box 82 remains open and the balance card No. 1 enters it.

Thus at the end of the operation the three balance cards Nos. 1, 2 and 4 which came from the balance card magazine 1 are in the reject box 82 together with the new balance cards Nos. 3 and 5 which came from the signal card magazine 116, all these cards being arranged in numerical order, card No. 1 being on top. At the same time the signal cards Nos. 3 and 5 which were in the balance card magazine 1 will be found in the card receiver 80.

It is pointed out that at the bottom of the pack in the reject box 82 is the dummy signal card from the signal card magazine 116, but since this is at the bottom of the pack it can readily be removed, likewise the blank card from the balance card magazine 1 is at the bottom of the pack of signal cards in the receiver 80.

The machine is driven by an electric motor (not shown) which through a belt 170 and pulley 171 drives a shaft 172 on which is mounted the first of the lower feed rolls 40.

The other two feed rolls 40 are driven from the shaft 172 by gears 173, 174, 175, 176, 177 and 178. Feed rolls 179 convey the cards from the pin box $P_1$ to the box 82 and if this box is closed, feed rolls 180 and 181 convey the card to the receiver 80. The feed rolls 179, 180 and 181 are driven from the gear 178 by gears 182, 183, 184, 185 and 186.

The shaft 21a is driven from the gear 174 which meshes with a large gear wheel 187 secured to the shaft 21a.

Driven from the shaft 172 by gears 188a, 188b, 188c and 188d (Fig. 3) is a stub shaft 189 carrying a bevel gear 190 meshing with a bevel gear 191 secured to a transverse shaft 192. At its other end the shaft 192 carries a further bevel gear 193 meshing with a bevel gear 194 on a stub shaft 195. The shaft 195 carries a gear (not shown) meshing with gears 196 and 197. The gear 196 drives feed rolls 81 which convey the cards from the pin box P2 to the receiver 80. The gear 197, through gears 198, 199 and 200 drives the feed rolls 40a.

Shaft 21b is driven from gear 199 by a large gear 201 secured to the shaft and meshing with gear 199.

The cards are conveyed from the signal card magazine 116 to the reject box 82 by feed rolls 202 driven from shaft 192 by gears 203.

In order to ensure raising of the comparing elements 41a and 41b after they have been depressed by the Bowden cables 10, 10a, a restoring plate 204 is disposed beneath them. Passing through the machine frame beneath the plate 204 (Fig. 11) are two rockable shafts 205, 206, to which are secured at each side of the plate 204 two levers 207, 207a, pivoted to the corners of the plate at 208, 208a and to each other by means of a pin and slot connection 209. Secured to the shaft 205 is a lever 210 pivoted by a pin and slot connection 211 to a lever 212 secured to a shaft 213 to which is also secured a lever 214.

Mounted on the gear wheel 187 secured to the shaft 21a is a roller 215 which, at each revolution of the shaft 21a rocks the lever 214 counter-clockwise in Figure 11 thereby lifting the plate 204. The latter is restored to its normal lowermost position by a spring 216.

What we claim is:

1. A statistical card sorting machine comprising in combination a first card magazine, a second card magazine and a signal card magazine, a first card sensing means, a second card sensing means, a first card feeding mechanism for feeding cards seriatim from said first magazine to said first sensing means, a second card feeding mechanism for feeding cards seriatim from said second magazine to said second sensing means, a first card arresting means for arresting a card after sensing by said first sensing means, a second card arresting means for arresting a card after sensing by said second sensing means, a first card receiver, a second card receiver, means for feeding a card from the signal card magazine to said first receiver, means for conveying cards from said first card sensing mechanism to either of said receivers selectively, means for conveying all cards from said second sensing means to said second receiver, means for comparing the sensings of two contemporaneously sensed cards; means operative under the control of the comparing means to render the first card arresting means effective and the first card feeding means ineffective when agreement occurs; means controlled by the comparing means to render the second card arresting means and the signal card feeding means effective, the second card feeding means ineffective and the first card conveying means effective to convey a card from the first sensing means to the second receiver when disagreement immediately follows agreement; and means controlled by the comparing means to render the second card arresting means effective, the second card feeding means ineffective and the first card conveying means effective to convey a card to the first receiver when disagreement immediately follows disagreement.

2. A statistical card sorting machine comprising in combination a first card magazine, a second card magazine and a signal card magazine, a first card sensing means, a second card sensing means, a first card feeding mechanism for feeding cards seriatim from said first magazine to said first sensing means, a second card feeding mechanism for feeding cards seriatim from said second magazine to said second sensing means, a first card arresting means for arresting a card after sensing by said first sensing means, a second card arresting means for arresting a card after sensing by said second sensing means, a first card receiver, a second card receiver, means for feeding a card from the signal card magazine to said first receiver, means for conveying cards from said first card sensing mechanism to either of said receivers selectively, means for conveying all cards from said second sensing means to said second receiver, means for comparing the sensing of two contemporaneously sensed cards; means operative under the control of the comparing means to render the first card arresting means effective and the first card feeding means ineffective when agreement occurs, means controlled by the comparing means to render the second card arresting means effective, the second card feeding means ineffective, and the first card conveying means effective to convey a card from the first sensing means to the second receiver when disagreement immediately follows agreement; and means controlled by the comparing means to render the second card arresting means effective, the second card feeding means ineffective and the first card conveying means effective to convey a card to the first receiver when disagreement immediately follows disagreement, a normally operative connection between the signal card feeding mechanism and the first card feeding mechanism, whereby at the first operation of said first card feeding mechanism after a period of inactivity said signal card feeding mechanism operates also, means for interrupting said connection after one operation of said feeding means and means operative under the control of the comparing mechanism when agreement occurs to re-establish said connection.

3. A statistical card sorting machine according to claim 1, wherein the card receivers are located in line between the two sensing mechanisms and with the first receiver nearer to the first sensing mechanism, and the means for conveying cards from the first sensing mechanism selectively to either receiver comprises in combination a shutter for said first receiver, a cam member normally holding said shutter open, a spring tending to close said shutter, a ratchet wheel having two teeth, an actuating pawl for said ratchet wheel, an operative connection between said pawl and the first card feeding mechanism, whereby at each operation of said first card feeding mechanism the pawl is operated, an operative connection between the ratchet wheel and the cam member, whereby one tooth movement of the ratchet disposes the cam member to permit closing of the shutter, and tooth movements of the ratchet wheel disposes the cam to close the shutter again, means for releasing the pawl from the ratchet when the comparing means detects agreement, and means for restoring the ratchet wheel to normal position when so released.

4. A statistical card sorting machine according to claim 1, including in combination normally inoperative means associated with the first card sensing means for sensing the presence or absence of a control hole in the cards, means operative under the control of said control hole sensing means to render the first card conveying means effective to convey a card from the first card sensing means to the first card receiver when the absence of a control hole is detected or to the second card receiver when the presence of a control hole is detected, means also operative under the control of said control hole sensing means to cause an operation of the signal card feeding means when the presence of a control hole is detected, and manually settable control means for disabling the comparing means and simultaneously rendering the control hole sensing means operative.

ARTHUR THOMAS.
    NORMAN GEOFFREY HOLDEN.